United States Patent
Huang et al.

(10) Patent No.: US 7,622,210 B2
(45) Date of Patent: Nov. 24, 2009

(54) FUEL SUPPLYING APPARATUS FOR A FUEL CELL WHICH STABILIZES FUEL CONCENTRATION

(75) Inventors: Chao-Jung Huang, Hsinchu (TW); Chih-Kun Lai, Hsinchu (TW); Kuo-Tung Huang, Hsinchu (TW); Jhy-Yeong Gau, Hsinchu (TW); Fu-Chi Wu, Hsinchu (TW); Wan-Jue Chiang, Hsinchu (TW); Keng-Yang Chen, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 694 days.

(21) Appl. No.: 10/798,839

(22) Filed: Mar. 12, 2004

(65) Prior Publication Data

US 2004/0191590 A1    Sep. 30, 2004

(30) Foreign Application Priority Data

Mar. 13, 2003  (TW) .............................. 92105443 A
Feb. 18, 2004  (TW) .............................. 93103881 A

(51) Int. Cl.
    *H01M 8/04*     (2006.01)

(52) U.S. Cl. .......................................... 429/34; 429/19
(58) Field of Classification Search ................. None
     See application file for complete search history.

(56) References Cited

U.S. PATENT DOCUMENTS

| 5,314,952 | A  | * | 5/1994  | Choi et al. ................... 525/119 |
| 6,440,594 | B1 |   | 8/2002  | Kindler et al. |
| 6,924,054 | B2 | * | 8/2005  | Prasad et al. .................. 429/34 |
| 7,147,950 | B2 | * | 12/2006 | Yonetsu et al. ................ 429/25 |
| 2004/0126646 | A1 | * | 7/2004 | Suda et al. ..................... 429/44 |

FOREIGN PATENT DOCUMENTS

| JP | 2001-185185 | 7/2001 |
| JP | 2001-291523 | 10/2001 |

* cited by examiner

*Primary Examiner*—John S Maples
(74) *Attorney, Agent, or Firm*—Rabin & Berdo, P.C.

(57) ABSTRACT

A fuel supplying apparatus is proposed, having a fuel and a polymer to control rate of fuel release. When the fuel supplying apparatus is applied in a fuel cell, the rate of fuel release is controlled using the polymer to maintain fuel concentration in the fuel tank of the fuel cell within a certain range without additionally installing devices and tubes for controlling fuel concentration. Thus, operation efficiency of the fuel cell is improved.

15 Claims, 3 Drawing Sheets

FUEL SUPPLYING APPARATUS FOR A FUEL CELL WHICH STABILIZES FUEL CONCENTRATION

FIELD OF THE INVENTION

The present invention relates to a fuel supplying apparatus comprising fuel and polymers for controlling rate of fuel release, and more particularly the present invention relates to a fuel supplying apparatus applicable to a fuel cell.

BACKGROUND OF THE INVENTION

Fuel cell is a power supplying apparatus that utilizes chemical fuels to conduct an oxidation/reduction reaction instead of a conventional combustion reaction to transfer chemical energy into electronic energy, producing clean exhaust in a safe and efficient manner. So, the fuel cell has become one new alternative for the fuel supply. On the other hand, a timely fuel replenishing is all it requires when the fuel cell is used as a power supply device. It is different from conventional rechargeable battery that requires continuous charging to maintain power supply. Thus, the fuel cell can be applicable to both stationary home appliances such as illuminating apparatus, televisions or refrigerators and portable electrical appliances such as vehicles, mobile phones, and laptops.

For a direct methanol fuel cell (DMFC), an anode of membrane electrolyte assembly (MEA) is immersed in a methanol solution to allow an oxidation-reduction reaction of the methanol on the anode, so as to transfer chemical energy into electronic energy. However, operation performance of the direct methanol fuel cell is highly associated with methanol concentration in its fuel tank. When the methanol concentration in the fuel tank is too low, the cell potential is reduced resulting in poor operation performance for the whole fuel cell. On the other hand, a highly concentrated methanol permeates a proton exchange membrane of the MEA to the cathode, causing a phenomenon called "fuel crossover" in which the methanol is oxidized at the cathode causing a practical loss of methanol fuel and poisoning of the cathode. As a result, a loss of operation performance is encountered. Thus, methods for maintaining the fuel concentration in the fuel tank of the DMFC within a certain range are critical factors to improve operation performance of fuel cells.

In addition, methanol used in direct methanol fuel cells is a volatile organic solvent that is highly toxic and inflammable which poses certain levels of hazard in terms of its storage, while it is not convenient to carry and add the liquid methanol. Thus, researches directed to DMFC have focused on ways to improve convenience in carrying and adding methanol as well as to reduce hazardous level associated with methanol fuel storage.

Japan Laid Open Patent No. 2001-185185 and 2001-291523 both disclose a fuel cell requiring additional devices and tubes to control the exhausted carbon dioxide, water, and the concentration of the fuel, so as to maintain certain performance for the fuel cell. However, additional devices may undesirably increase the overall cost and size for the fuel cell, making the fuel cell of this type not suitable for small sized electronic devices and portable electronic devices. Furthermore, U.S. Pat. No. 6,440,594 discloses a direct methanol fuel cell in which the fuel is provided in the form of an aerosol of liquid fuel droplets suspended in a gas to solve the foregoing drawbacks. However neither characteristics of the materials, nor control for rate of the fuel release is specified in this patent.

SUMMARY OF THE INVENTION

A primary objective of the present invention is to provide a fuel supplying apparatus that does not require additional devices or tubes to control the fuel concentration, and is capable of releasing fuel at an appropriate rate. The fuel supplying apparatus controls rate of fuel release via its material characteristics, and thus is capable of maintaining the fuel concentration in the fuel tank of the fuel cell, so as to prevent the inappropriate fuel concentration from affecting operation performances. Moreover, the fuel supplying apparatus has other advantages such as ease for carrying and convenience for storing or adding the fuel.

The fuel supplying apparatus of the present invention controls the rate of fuel release using different mechanisms based on types of the fuel and characteristics of the polymer. The polymer may be a porous, cross-linked or thermoplastic resin polymer. According to one embodiment of the present invention, the fuel supplying apparatus may select either absorbable or adsorbable porous polymer with high molecular weight to serve as a carrier for the fuel, depending on the types of the fuel. After the fuel carrier has thoroughly absorbed or adsorbed the fuel to form a colloidal fuel supplying apparatus, the colloidal supplying apparatus is placed in a fuel tank containing the solvent, so that the absorbed or adsorbed fuel of the colloidal fuel supplying apparatus is released into the fuel tank via diffusion at an appropriate rate. Moreover, the characteristics of the porous polymer with high molecular weight may be adjusted by changing its monomer composition, substituent group, molecular weight and structure according to the types of fuel, so as to control the rate of fuel release for the colloidal fuel supplying apparatus. As a result, the fuel concentration in the fuel tank is maintained within a certain range.

On the other hand, as it is characterized that the fuel supplying apparatus of the present invention does not release any methanol fuel without being moistened by water, a fuel cell can be taken off before it is used, so as to provide advantages such as ease for carrying and convenience for storing.

As the fuel supplying apparatus of the invention is applied in a direct methanol fuel cell (DMFC) that uses methanol as a fuel, the fuel carrier is preferably polyamide resin. The polyamide resins include but are not limited to the polyamide resin, such as nylon 66 formed by polymerization of hexamethylene diamine and hexanedioic acid; nylon 610 formed by polymerization of hexamethylene diamine and sebacic acid; co-polymer of nylon 610 and nylon 66; and nylon 6/66/610/12 made by polymerization of nylon 6 formed by ring-opening polymerization of caprolactam, nylon 12 formed by polymerization of laurolactam, nylon 610, and nylon 66. The polyamide resins all have the characteristics to absorb or adsorb methanol, thereby can act as the fuel carrier for the colloidal methanol fuel supplying apparatus.

Among all the polyamide resins, the resins formed respectively by polymerization of nylon 66 and nylon 610, and polymerization of the nylon 6/66/610/12 are most preferable. For the colloidal methanol fuel supplying apparatus, an excessively high content of nylon 610 will reduce amount of methanol being adsorbed, and thereby the usage duration for the colloidal fuel supplying apparatus is shortened. On the other hand, if nylon 66 content is too high, the amount of methanol being adsorbed will be increased to extend the usage duration for the colloidal fuel supplying apparatus. However, the colloidal methanol fuel supplying apparatus formed as such has a poor shape. Thus, in the case of colloidal methanol fuel supplying apparatus, the ratio for nylon 66 and nylon 610 should be preferably 1:1.

The above-mentioned colloidal methanol fuel supplying apparatus that uses methanol as the fuel and polyamide resin as the fuel carrier is formed by mixing an appropriate amount of polyamide resins at an appropriate temperature (50° C.) with an appropriate amount of methanol. After the polyamide resins are completely dissolved, the resulting mixture is incubated at an appropriate temperature (5° C.) until a gel-like structure is formed.

When the colloidal methanol fuel supplying apparatus is applied in the DMFC, the fuel concentration in the fuel tank is effectively controlled without additionally providing devices or tubes for controlling fuel concentration. In addition, as methanol is a toxic organic solvent, which is highly volatile and inflammable under normal circumstances, it is difficult to be stored. As colloidal methanol fuel supplying apparatus is present as a gel-like structure before it is used, it possesses advantages such as ease for carrying, convenience for storing and topping up the fuel as compared to the conventional liquid methanol fuel.

In another embodiment of the present invention, the fuel supplying apparatus is provided with the fuel encapsulated by a cross-linked membrane, which acts as a fuel controlling membrane. The cross-linked membrane selectively allows the fuel but not other solvents in the fuel tank to permeate through. The fuel encapsulated by the cross-linked membrane is then released into the fuel tank via diffusion at an appropriate rate. Since the cross-linked membrane allows only the fuel to permeate through, the cross-linked membrane serves as a one-way gate to the fuel encapsulated therein, such that the fuel is released at a rate controlled by diffusion and the fuel concentration in the fuel tank is maintained within a certain range. Thus, the cross-linked membrane is efficient in providing the fuel and maintaining the fuel concentration.

Further, the fuel controlling membrane described above can be designed as a double-layered compound membrane consisting of the above mentioned cross-linked membrane and another cross-linked membrane. The second cross-linked membrane is preferably selective to allow the fuel permeating through only under certain circumstances, such as circumstances having certain temperature, moisture level, pH or solvent. Thus, the fuel supplying apparatus formed with this double-layered compound membrane in which the first and second cross-linked membranes are positioned respectively on the inner and outer sides thereof can not only effectively control the rate of fuel release, but also has advantages such as ease for storage and direct use.

Within the double-layered compound membrane, a porous substrate may be disposed between the first and second cross-linked membranes, so as to adjust the hardness and structure of the double-layered membrane. Alternatively, the double-layered membrane may be mounted on walls of a soft container before filling the membrane with the fuel so as to form the fuel supplying apparatus of the present invention. When the fuel supplying apparatus is not used, the fuel is blocked from releasing by the second cross-linked membrane. When the fuel supplying apparatus is used, the fuel supplying apparatus is placed in the fuel tank to change characteristics of the second cross-linked membrane under certain circumstances, so that the fuel encapsulated by the double-layered membrane is released into the fuel tank at an appropriate rate. Therefore, the fuel concentration in the fuel tank can be maintained within a certain range.

As the fuel supplying apparatus is applied in the DMFC, the cross-linked membrane for encapsulating the methanol fuel has appropriate methanol permeability and is impermeable to water. This allows the methanol fuel to permeate through the cross-linked membrane via diffusion and to release into the water solution of the fuel tank at an appropriate rate. The cross-linked membrane can be made of polyvinyl acetate, oligomers or copolymers of vinyl pyrrolidone and polytetrafluoroethylene. The cross-linked membrane, which is selectively permeable to methanol but impermeable to water, is preferably made of polyvinyl acetate, azobisisobutyronitrile (AIBN) and glycol diacrylate. Thus, the methanol encapsulated within the cross-linked membrane can be released into the fuel tank at the appropriate rate, allowing the fuel concentration to be maintained within a certain range.

Moreover, a water-soluble cross-linked membrane, such as polyvinyl alcohol cross-linked membrane may be disposed on the cross-linked membrane to form a double-layered compound membrane. The second cross-linked membrane made of polyvinyl alcohol is only permeable to the methanol fuel only under the circumstance where the membrane is moistened by water. So, the fuel supplying apparatus made of the doubled layered compound membrane and the methanol fuel does not release the fuel encapsulated therein without moistened by water. Therefore, the fuel supply apparatus may be easy to carry and convenient to store. When the fuel supply apparatus is used, it is placed in the fuel tank so as to soak the second cross-linked membrane of the double-layered compound membrane with water in the fuel tank. Then, the methanol fuel encapsulated in the double-layered compound membrane permeates via diffusion through the first and second cross-linked membranes to release in the fuel tank at an appropriate rate. On the other hand, water in the fuel tank is blocked from infiltrating into the double-layered compound membrane with the cross-linked membrane formed at the inner layer of the double-layered compound membrane. So, the cross-linked membrane serves as a one-way gate to control methanol release. As a result, the methanol fuel encapsulated within the double-layered compound membrane is released continuously, while the fuel concentration in the fuel tank is maintained within a certain range.

Apart from direct methanol fuel cells, the fuel supplying apparatus of the invention is also applicable to other fuel cells. The fuel for the fuel supplying apparatus includes but is not limited to methanol, ethanol, propanol, formaldehyde or formic acid. The polymers used for controlling the rate of fuel release can also be modified depending on types of the fuel, the mechanisms for controlling the fuel release, and the required rate of fuel release.

The present invention further provides a method for maintaining the fuel concentration in a fuel cell. The foregoing fuel supplying apparatus that comprises a fuel and a polymer for controlling rate of fuel release is used. Since the rate of fuel release is controlled via the characteristic of the polymer itself, the rate of fuel release can be modified by using different polymers or changing the characteristic of the polymer via modifying molecular weight, substituent group, or additives. As a result, the rate of fuel release controlled by the fuel supplying apparatus is approximately equal to the rate of fuel consumption in the fuel tank, so as to maintain the fuel concentration in the fuel tank within a certain range. According to the method of present invention, there is no need for installing additional devices or tubes for controlling the fuel concentration in the fuel tank. As such, "crossover" phenomenon can be solved by preventing methanol at the anode to permeate across the proton exchange membrane of the membrane electrolyte assemblies (MEA) to the cathode, causing cathode poisoning. Moreover, operation performance can be improved by eliminating the problem associated with low fuel concentration due to methanol fuel consumption in the fuel tank.

The present invention can be more fully understood by reading the following exemplary preferred embodiments. However it is to be understood that the scope of the invention should not be limited to the disclosed embodiments.

BRIEF DESCRIPTION OF THE DRAWINGS

The drawings included herein provide a further understanding of the present invention. A brief introduction of the drawings is as follows.

DETAILED DESCRIPTION OF THE PREFERRED EMBODIMENTS

PREPARATION EXAMPLE 1

80 g of methanol is mixed with 20 g of polyamide resin (nylon CM80000 made by TORAY) in a 1000 ml flask at 50° C. After the polyamide resin is fully dissolved, the resulting solution is maintained at a temperature of ° C. 5 for 24 hrs until it solidifies. Accordingly, a colloidal fuel supplying apparatus of the present invention is formed.

PREPARATION EXAMPLE 2

20 g of polyvinyl acetate, 0.4 g of AIBN and 0.6 g of glycol diacrylate are mixed together in a reacting flask until all the reactants are dissolved. The resulting solution is then injected into a plastic molding equipment and heated at 60° C. for 4 hours. Next, the heating temperature is increased to 75° C. and further heated for 1 hr. After the molding equipment is removed, a cross-linked membrane for encapsulating the methanol fuel is obtained. The cross-linked membrane is filled with methanol and sealed up to fabricate the fuel supplying apparatus according to the present invention.

EXPERIMENTAL EXAMPLE 1

Figure 1:
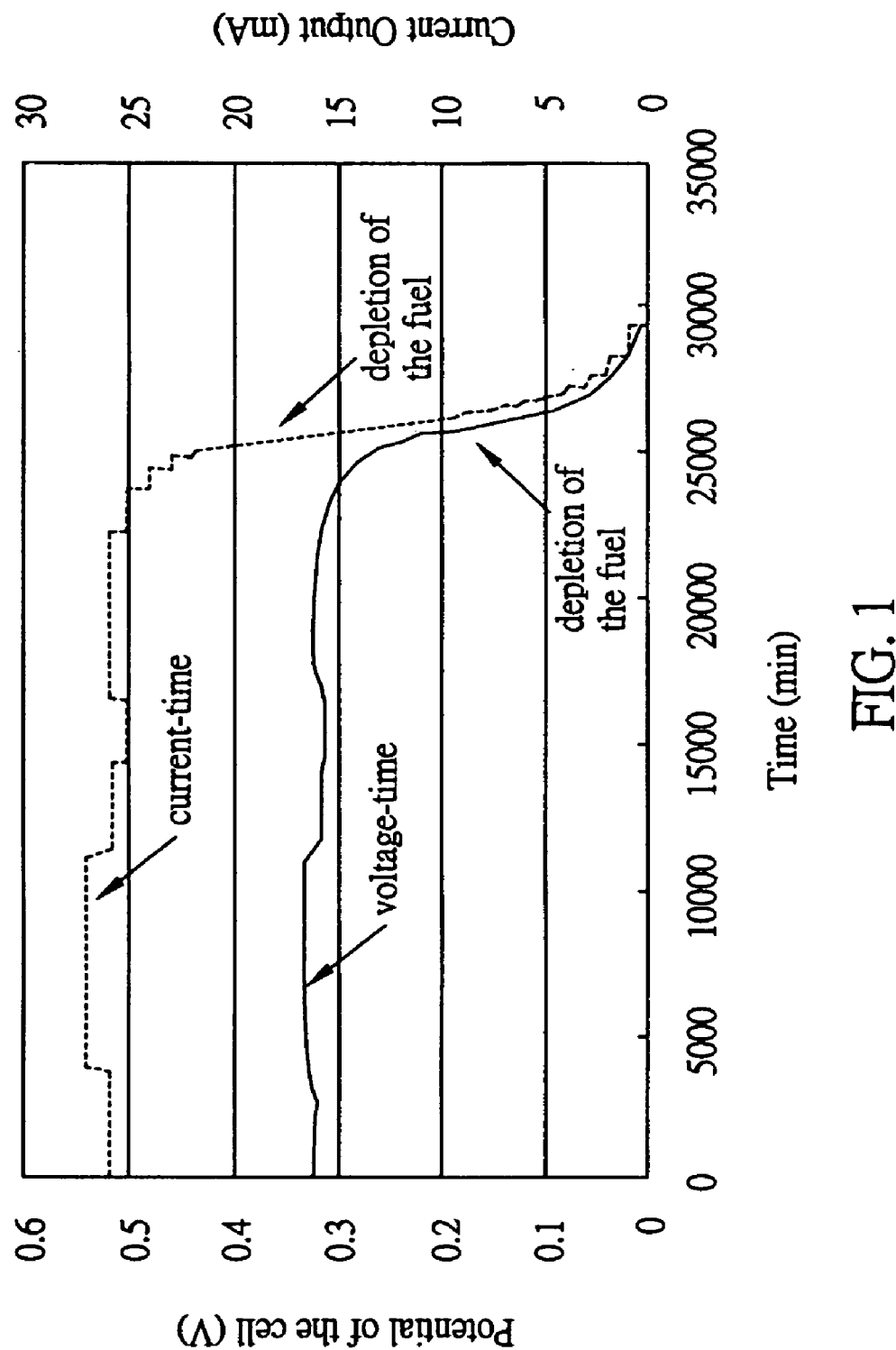
FIG. 1 illustrates a result for measuring potential difference and current change of the DMFC battery of the gel-type fuel supplying apparatus according to the present invention.

For discharging the DMFC with a 10Ω constant load, the gel-type fuel supplying apparatus containing 2.5 grams of methanol prepared according to the preparation example 1 is released in the battery fuel tank containing 4.5 grams of water (10 mls of total volume). The methanol concentration in the fuel tank is measured to be about 10% w/w (while a distilled water is constantly supplemented to maintain a liquid height in the fuel tank), and measurements for the battery potential difference and the change of current flowing through the 10Ω load are illustrated in FIG. 1.

MEA Compositions
(1) anode:
  contact catalyst: E-tek 20% Pt/C
  area: 25 cm$^2$
  attachment amount: 1 mg/cm$^2$
(2) cathode
  contact catalyst: E-tek 40% PtRu/C
  area: 25 cm$^2$
  attachment amount: 2 mg/cm$^2$
(3) plasma exchange membrane (PEM): Dupont Nafion117®

EXPERIMENTAL EXAMPLE 2

For discharging the DMFC with a 10Ω constant load, 2.5 grams of methanol is directly released in the battery fuel tank containing 6.7 grams of water (10 mls of total volume). The methanol concentration in the fuel tank is measured to be about 27% w/w, and measurements for the battery potential difference and the change of current flowing through the 10Ω load are illustrated in FIG. 2.

Figure 2:
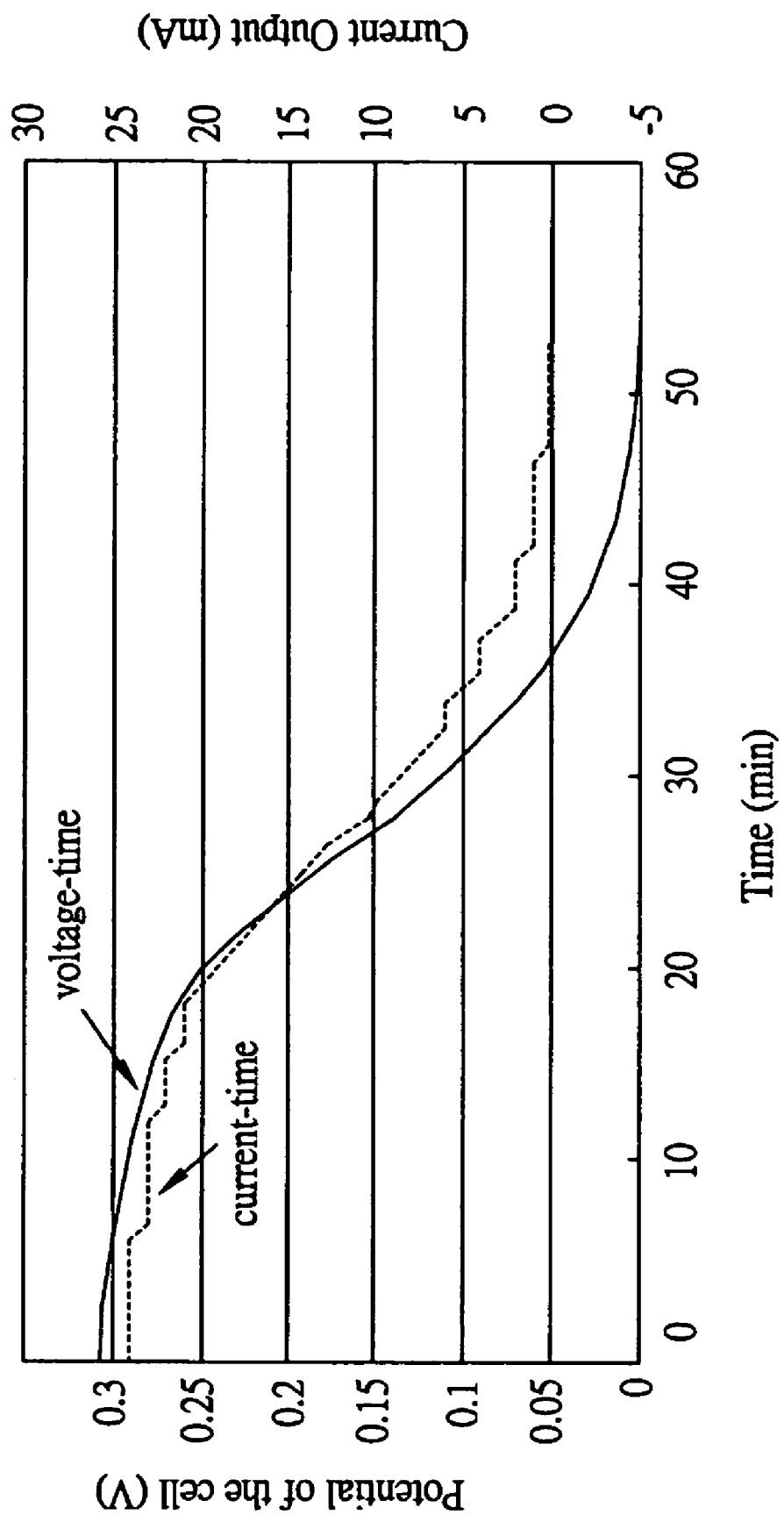
FIG. 2 illustrates a result for measuring potential difference and current change of the DMFC battery after adding methanol fuel in a battery fuel tank.

It is understood from results in FIGS. 1 and 2 that when equal amount of the methanol fuel is administered in the fuel tank of the DMFC battery, the speed for fuel release is effectively regulated using the fuel supplying apparatus of the present invention, so that the fuel concentration in the fuel tank is controlled to about 10% w/w, while the battery constantly provides steady operative effect for about 500 hours until the methanol in the fuel supplying apparatus is completely released. Conversely, if the same amount of the methanol is administered in the fuel tank without a control of the speed for methanol fuel release, the fuel concentration in the fuel tank would directly rise up to 27% w/w, leading to penetration of the MEA by highly concentrated methanol and a gradual malfunction for the battery system. As a result, the potential difference and current would approach to zero after 45 minutes.

EXPERIMENTAL EXAMPLE 3

The fuel applying apparatus fabricated according to the preparation example 2 is released in the container filled with deionized water. The differences in the methanol concentration in the cross-linked membrane and the container are measured individually and the results are illustrated in FIG. 3.

Figure 3:
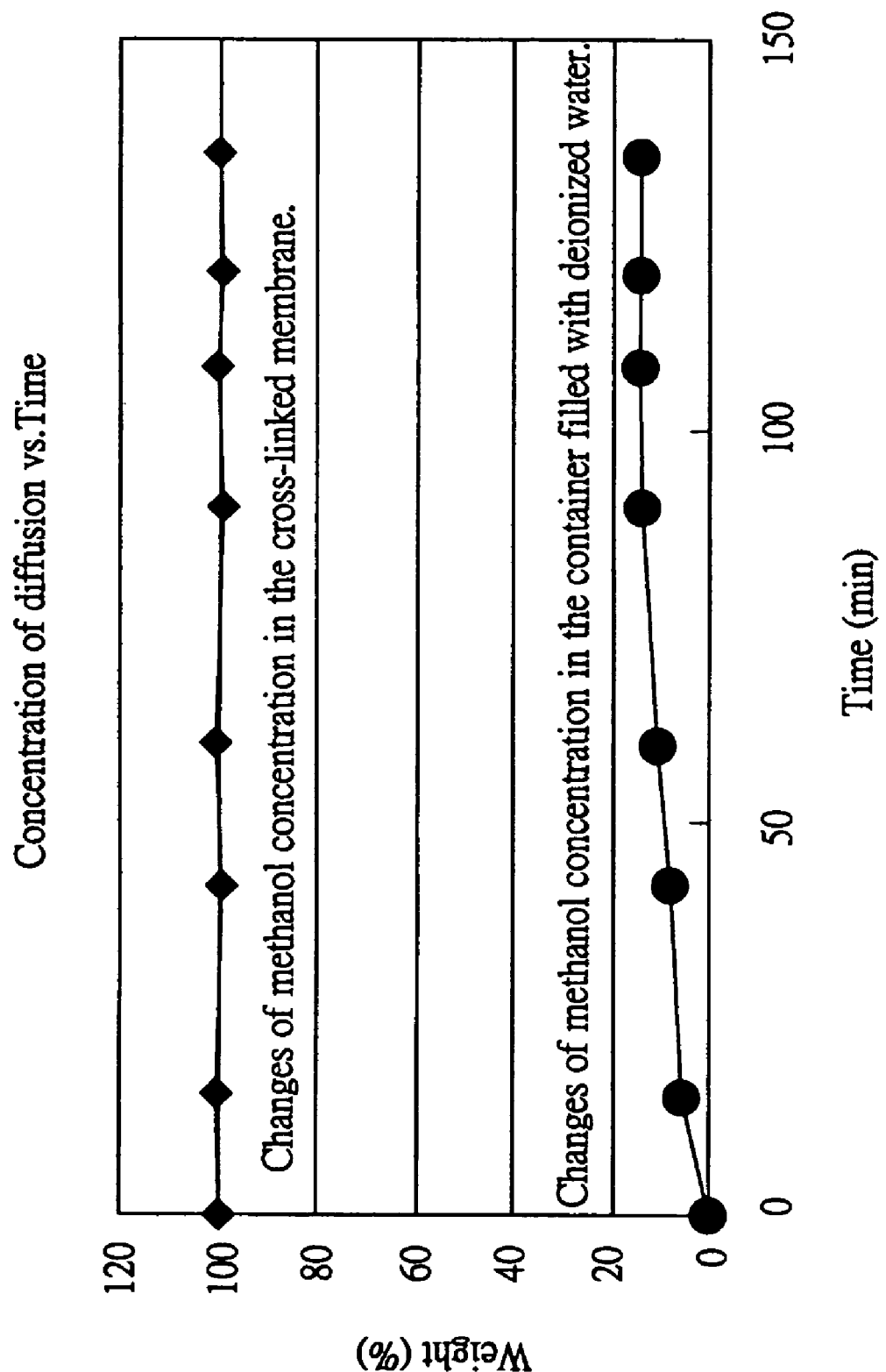
FIG. 3 illustrates a measurement result for the release of the methanol fuel in the water from the fuel supplying apparatus fabricated by encapsulating the methanol fuel with the cross-linked membrane according to another embodiment of the present invention.

Referring to FIG. 3, the methanol concentration in the cross-linked membrane is maintained at 100% w/w while the methanol concentration in the container is constantly maintained within 10% to 16% w/w. Thus, the cross-linked membrane is proved to serve as a one-way gate for the methanol fuel, so that it provides a function to constantly release the methanol fuel.

What is claimed is:

1. A fuel supplying apparatus in a fuel tank of a fuel cell, comprising:
  a fuel; and
  a cross-linked membrane for encapsulating the fuel and isolating the fuel from a fuel solvent in the fuel tank, wherein the cross-linked membrane is only permeable to the fuel and is a single-layered cross-linked membrane allowing the fuel to permeate in one direction; and
  wherein the cross-linked membrane serves as a one-way gate to the fuel encapsulated therein, such that the fuel is released at a rate controlled by diffusion.

2. The fuel supplying apparatus of claim 1, wherein the fuel is methanol.

3. The fuel supplying apparatus of claim 1, wherein the fuel and the cross-linked membrane are formed to have a gel-like structure.

4. The fuel supplying apparatus of claim 1, wherein the single-layered cross-linked membrane is selected from the group consisting of polyvinyl acetate, oligomers and copolymers of vinyl pyrrolidone, and polytetrafluoroethylene.

5. The fuel supplying apparatus of claim 1, further comprising a second cross-linked membrane formed on an outer layer of the single-layered cross-linked membrane to be permeable only to the fuel under certain circumstances so as to form a multi-layered complex membrane.

6. The fuel supplying apparatus of claim 5, further comprising a porous substrate provided between the single-layered cross-linked membrane and the second cross-linked membrane.

7. The fuel supplying apparatus of claim 5, wherein the second cross-linked membrane is made of polyvinyl alcohol.

8. The fuel supplying apparatus of claim 5, wherein the fuel comprises methanol, and wherein the second cross-linked membrane is moistened so as to be permeable to the methanol.

9. A fuel supplying apparatus in a fuel tank of a fuel cell, comprising:
   a fuel; and
   a cross-linked membrane for encapsulating the fuel and isolating the fuel from a fuel solvent in the fuel tank,
   wherein the cross-linked membrane is permeable only to the fuel,
   wherein the fuel and the cross-linked membrane are formed to have a gel-like structure;
   wherein the cross-linked membrane is a single-layered cross-linked membrane allowing the fuel to permeate in one direction; and
   wherein the cross-linked membrane serves as a one-way gate to the fuel encapsulated therein, such that the fuel is released at a rate controlled by diffusion.

10. The fuel supplying apparatus of claim 9, wherein the fuel is methanol.

11. The fuel supplying apparatus of claim 9, wherein the single-layered cross-linked membrane is selected from the group consisting of polyvinyl acetate, oligomers and copolymers of vinyl pyrrolidone, and polytetrafluoroethylene.

12. The fuel supplying apparatus of claim 9, further comprising a second cross-linked membrane formed on an outer layer of the single-layered cross-linked membrane to be permeable only to the fuel under certain circumstances so as to form a multi-layered complex membrane.

13. The fuel supplying apparatus of claim 12, further comprising a porous substrate provided between the single-layered cross-linked membrane and the second cross-linked membrane.

14. The fuel supplying apparatus of claim 12, wherein the second cross-linked membrane is made of polyvinyl alcohol.

15. The fuel supplying apparatus of claim 12, wherein the fuel comprises methanol, and wherein the second cross-linked membrane is moistened so as to be permeable to the methanol.

* * * * *